United States Patent
Hansen

[15] 3,653,477
[45] Apr. 4, 1972

[54] SELF-COOLING CLUTCH AND BRAKE

[72] Inventor: Quinten A. Hansen, 4338 Highway 38, Franksville, Wis. 53126

[22] Filed: July 21, 1970

[21] Appl. No.: 56,905

[52] U.S. Cl. .................. 192/113 B, 192/18 A, 188/264 E
[51] Int. Cl. ........................... F16d 13/72, F16d 67/02
[58] Field of Search ........... 192/113 B, 18 A, 85 C, 87.14; 188/264 E

[56] References Cited

UNITED STATES PATENTS

| 3,301,367 | 1/1967 | Yokel | 192/113 B |
| 2,386,220 | 10/1945 | Lawler et al. | 192/113 B X |
| 2,869,701 | 1/1959 | Yokel | 192/113 B X |
| 3,491,863 | 1/1970 | Karlsson et al. | 192/18 A |

Primary Examiner—Benjamin W. Wyche
Attorney—Wheeler, House & Wheeler

[57] ABSTRACT

A rod which operates the disks of a clutch or brake is provided at its ends with pistons which, in each operation, pump coolant from a sump and eject it onto the disks for the cooling thereof. The same pistons may constitute fluid pressure means for the operation of the rod.

10 Claims, 6 Drawing Figures

Patented April 4, 1972

Inventor
Quinten A. Hansen
By
Whale, Whale, House & Clemency
Attorneys

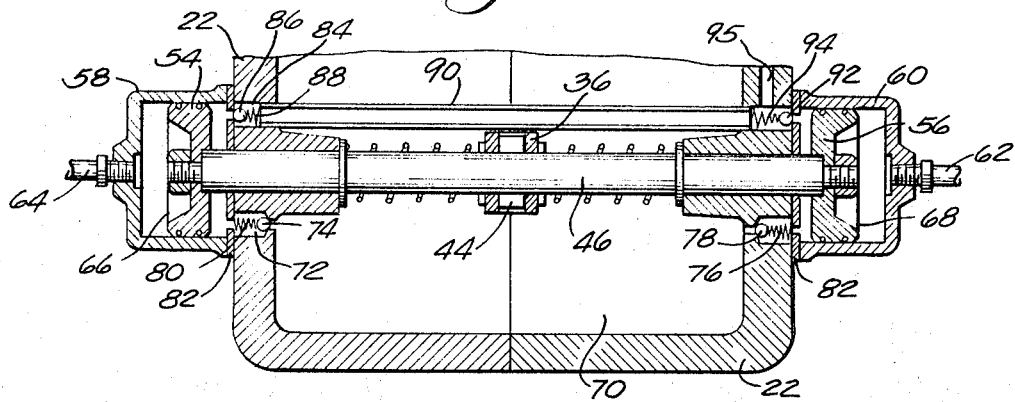
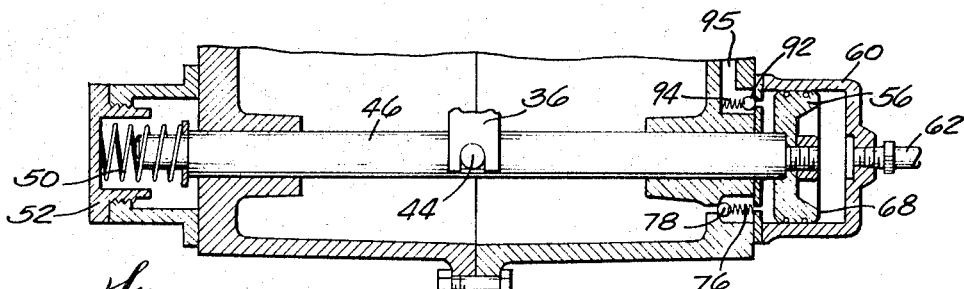
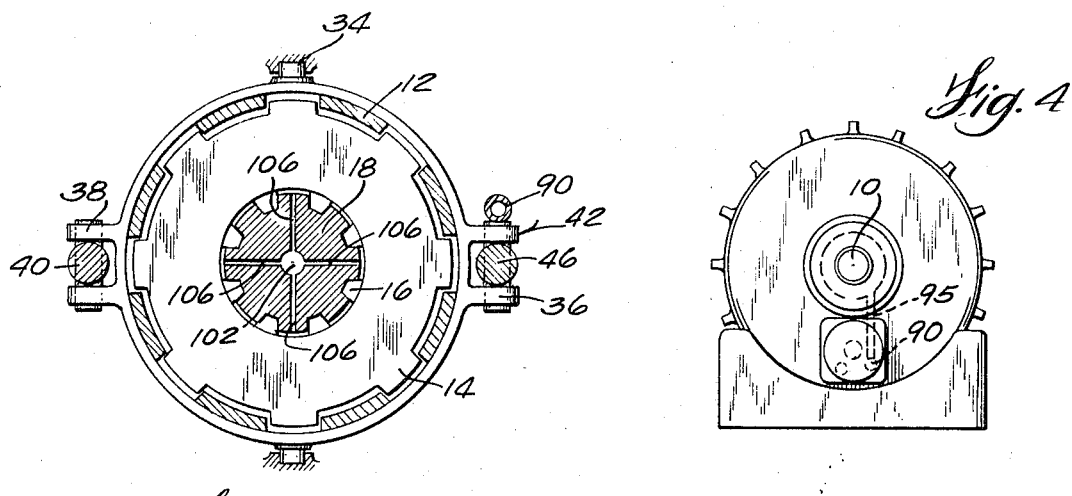

3,653,477

SELF-COOLING CLUTCH AND BRAKE

BACKGROUND OF INVENTION

A clutch and/or brake which is heavily loaded may have its disk pack or packs become overheated unless provision is made for the cooling thereof. The more often the disks are cycled the greater will be the tendency to heat. Inasmuch as the instant device pumps coolant over the disks in each operation, it will be apparent that the greater the tendency to heat the greater will be the cooling effect.

SUMMARY OF INVENTION

As will be shown, the pressure plate may be operated manually or by fluid pressure in one or both directions of movement. In one or both directions the rod connected with the plate-actuating yoke pumps coolant from a sump and delivers it to a pressure duct in the driven shaft to be ejected through appropriate nozzles onto the disks of the pack. In the preferred arrangement, the yoke is actuated by a rod which has a piston at each end. The pistons operate in appropriate cylinders supplied with air or liquid for the actuation of the yoke. The opposite ends of the respective cylinders have check valved connections from a sump and to a chamber encircling the driven shaft. From that chamber a pressure duct within the shaft receives coolant for delivery to the respective disk packs of a clutch and brake.

BRIEF DESCRIPTION OF DRAWINGS

FIG. 2 is a view in transverse section on the line 2—2 of FIG. 1.

FIG. 3 is a detail view in section on the line 3—3 of FIG. 1.

FIG. 4 is a view of the apparatus in end elevation.

FIG. 6 is a view similar to a portion of FIG. 1 showing a modified embodiment wherein the yoke is spring-actuated in one direction.

DETAILED DESCRIPTION

Figure 1:
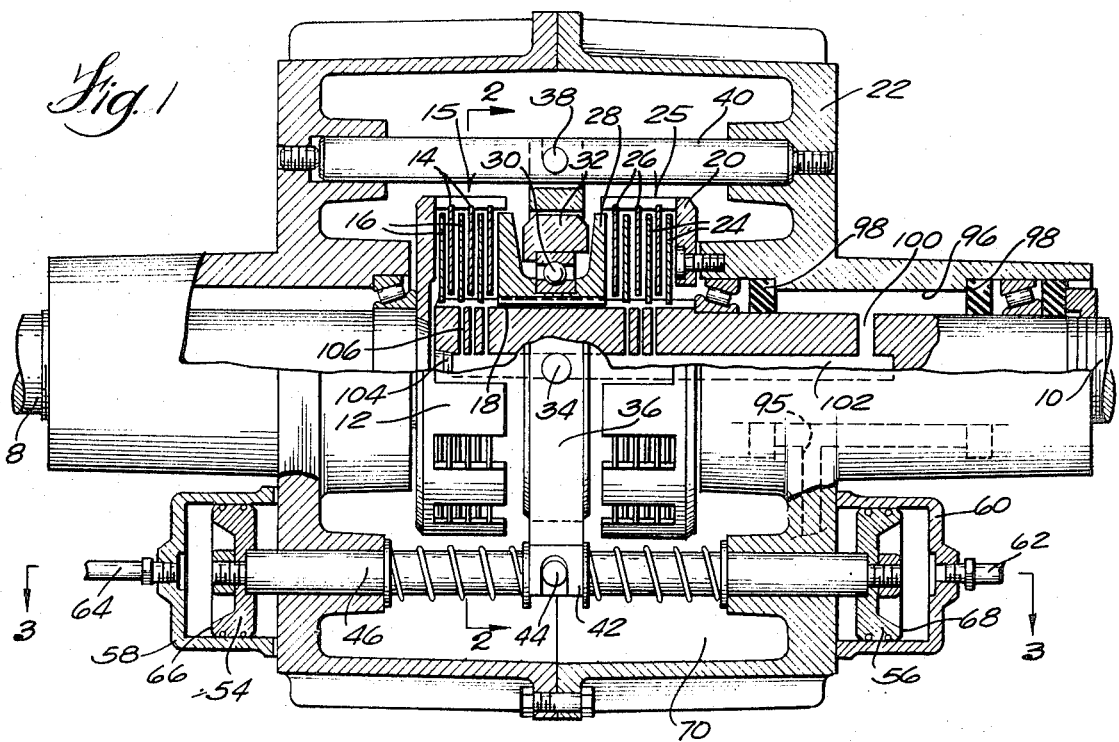
FIG. 1 is a view partially in side elevation but largely in axial section through a combination clutch and brake assembly having cooling means in accordance with the invention.

In the exemplification shown in FIG. 1, there is a power input shaft at 8 and an output shaft at 10. The input shaft carries a clutch spider 12 engaged with alternate disks 14 of a disk pack 15 which has intervening disks 16 keyed to a splined sleeve 18 on the driven shaft 10.

The clutch spider 20 is fixed to the housing 22 and carries disks 24 of a disk pack 25, the intervening disks 26 being keyed by the aforesaid splined sleeve 18 on driven shaft 10.

Between the disk packs 15 and 25 is a spool-shaped pressure plate 28 reciprocable to engage either disk pack. It is actuated by means of a bearing 30 mounted in a ring 32 fulcrumed on a cross pin 34 to a lever yoke 36 pivoted at 38 to a reaction rod 40 mounted in the housing 22.

Figure 5:
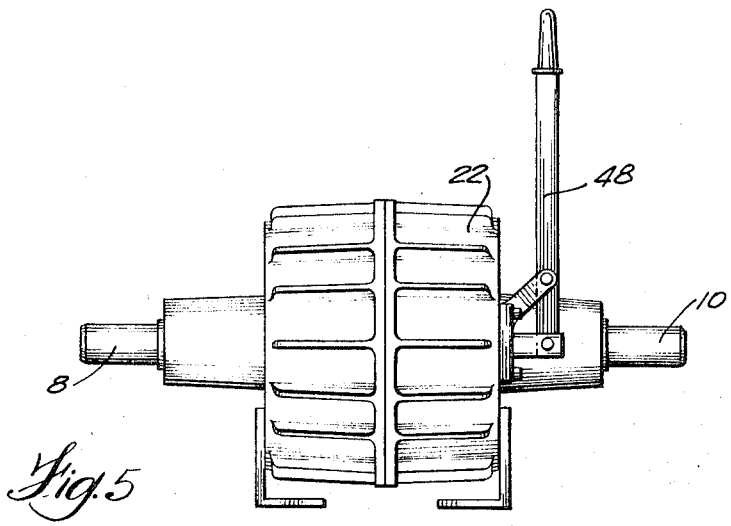
FIG. 5 is a side elevational view of a modified embodiment designed for operation manually rather than by fluid pressure.

The lever yoke 36 has its movable end 42 engaged with a cross pin 44 on the actuating rod 46 which reciprocates through the housing 22 on an axis parallel to the shafts 8 and 10. This rod may be operated by a hand lever 48 as shown in FIG. 5, or it may be operated in one direction by a compression spring 50 having a seat 52 which is threadedly adjustable to control spring bias as shown in FIG. 6.

However, in the preferred arrangement shown in FIG. 1 and FIG. 3, the actuating rod 46 is operated in both directions by fluid pressure. At its respective extremities, it carries pistons 54 and 56 respectively operating in cylinders 58 and 60 separably fastened externally in the housing. For clutch engagement, the pressure of a fluid such as oil or air is supplied through a pipe 62 into the closed end of cylinder 60 to force the piston 56 and the rod 46 toward the left as viewed in FIG. 3, thus oscillating the yoke lever 36 on its fulcrum 38 to cause the spool-shaped pressure plate 28 to compress the disk stack 15 for engagement of the driving and driven disks to transmit motion from the drive shaft 8 through sleeve 18 to the driven shaft 10.

If fluid pressure is delivered through the pipe 64, to the closed end of cylinder 58, the actuating rod 46 is caused to move to the right as viewed in FIG. 3, thereby effecting pressure engagement of the driving and driven disks in pack 25 to clutch the driven shaft to the fixed housing 22 in order to brake the motion of such shaft.

While the outer faces 66 and 68 of the respective pistons 54 and 56 are thus subjected to fluid pressure for brake and clutch actuation, the inner faces of such pistons, operating in the respective cylinders 58 and 60, are used to pump coolant to the disk packs 15 and 25 from a sump 70. In the instant device, for example, the sump is in the bottom of the fixed casing 22 where it receives coolant draining from the packs. As best shown in FIG. 3, there is an opening at 72 leading from the sump into cylinder 58, such opening being controlled by a ball-check valve 74 through which coolant is drawn into cylinder 58 during outward movement of the piston 54 therein.

Similarly, there is a duct at 76 opening from the sump 70 through the wall of the casing 22 into the external cylinder 60, this duct being controlled by a ball-check valve 78 which permits coolant to flow from sump 70 into cylinder 60 during the outward movement of the piston 56. Each of the ball-checks is preferably subject to the bias of a spring 80 seated against a retainer plate 82.

A duct 84 opens from the cylinder 58 and is subject to the control of a check valve ball 86 seated against the pressure plate 82 subject to the bias of a compression spring 88. This arrangement permits coolant to flow from the cylinder 58 through the ball check 86 into an oil tube 90 when the piston 54 is moving inwardly or to the right as shown in FIG. 3.

A similar arrangement permits flow of coolant from cylinder 60 toward the tube 90 past a ball check 92 seated by means of a compression spring 94 against the retainer plate at that end of the device.

A delivery pipe or duct 95 leads from one end of the tube 90 through the casing wall to a pressure chamber 96 encircling the shaft 10 within casing sleeve 85. This chamber is closed at its ends by appropriate seals 98 of any desired construction. The coolant flows from the pressure chamber through the radial ducts 100 to a duct 102 extending axially of the output shaft 10. This duct is plugged at 104 and has discharge branch ducts 106 directed centrally into the respective packs 15 and 25 for the cooling of the disks thereof.

It will be apparent from the foregoing description that in each actuation of each of the disk packs coolant will be pumped from sump 70 and projected into both packs.

It will also be apparent that the same result is achieved if the rod 46 is actuated by hand lever 48 instead of by making use of the pistons to effect fluid actuation thereof.

If the actuating rod 46 is spring-impelled in one direction as shown in FIG. 6, there will only be one-half as many deliveries of coolant, since only piston 56 is being used for this purpose. However, this will be adequate for many purposes.

I claim:

1. In combination a disk pack, a shaft to which selected disks of said pack are connected, other disks of said pack interleaved with said selected disks and having other connections, a pressure plate for engaging the disks of said pack, means including a lever for the actuation of said pressure plate, an actuating rod connected with said lever and carrying a piston, a cylinder in which the piston is reciprocable in the course of movement of said rod, a source of coolant, means including valve-controlled ports for admitting coolant from said source to said cylinder and for discharging coolant from said cylinder in the course of piston movement therein, and means leading from said cylinder for the delivery of discharged coolant onto disks of said pack.

2. A combination brake and clutch including driving and driven shafts and a fixed support, a splined sleeve on the input shaft, a pair of disk packs having selected disks engaged with said sleeve, a first spider having intervening disks of one of said packs engaged with it, said first spider being connected with the driving shaft, a second spider connected with the fixed support and having intervening disks of the second pack connected with it, pressure plate means between said packs, a lever for the actuation of the pressure plate means, said lever being provided with a fulcrum and with a connection to the pressure plate means and having a movable end, a rod having a pintle to which the movable end of the lever is pivoted, separate pistons mounted on the rod for reciprocation therewith, cylinders in which the respective pistons are operatively disposed, a source of coolant having valve-controlled communication with the respective cylinders, a valve-controlled sump means including ports opening to the respective cylinders, and check valves controlling said ports, and valve-controlled duct means leading to points of discharge for delivery of coolant to the respective packs.

3. A clutch and brake according to claim 2 in which the respective cylinders have fluid pressure actuating connections for the operation of said rod through the respective pistons to engage the pressure plate selectively with the first and second disk packs.

4. A combination clutch and brake including a housing, aligned driving and driven shafts extending into the housing, a clutch spider connected with the driving shaft, a brake spider connected with the housing, disk packs having selected disks connected respectively with the clutch spider and the brake spider, a sleeve on the driven shaft with which intervening disks of the respective packs are connected, a spool-shaped pressure plate between the respective packs, said plate being operable axially of the driven shaft for delivering pressure selectively upon either of said packs, a yoke lever having one end pivotally connected with said housing and having a bearing ring connecting it with said pressure plate, an actuating rod having pivotal connection with said yoke lever for the oscillation of the yoke lever for selective exertion of thrust through the pressure plate upon either of said packs, a piston mounted on at least one end of the said rod, a cylinder in which the piston is reciprocable, said housing having a sump for coolant, a valve-controlled port opening from said sump into the cylinder, a valve-controlled port leading outwardly from the cylinder, and duct means leading from said last mentioned port to one of said packs for delivering coolant thereto.

5. A combination clutch and brake according to claim 4 in which said rod is provided with fluid-pressure means for actuation thereof in at least one direction.

6. A combination according to claim 4 in which said rod has means for manually reciprocating it.

7. A combination according to claim 4 in which a sleeve of said housing encircles the driven shaft and provides an annular chamber which constitutes a part of said duct means, and seals closing said chamber about said shaft.

8. A combination brake and clutch according to claim 4 in which said rod has pistons at both of its ends and said housing has externally accessible cylinders in which the respective pistons are reciprocable, each of said cylinders having fluid pressure pipes leading thereto, each of said cylinders having valve-controlled ports opening from said sump and duct means including valve-controlled ports leading from the respective cylinders, the duct means leading from both cylinders having discharge connections toward both packs.

9. A combination clutch and brake comprising a housing, driving and driven shafts in substantial alignment and having bearings in said housing, a clutch spider mounted on the driving shaft within the housing, a brake spider disposed within the housing and connected to the housing and encircling the driven shaft, a splined sleeve upon the driven shaft, a clutch disk pack including disks connected with the clutch spider and interleaved disks connected with said sleeve, a brake disk pack including disks connected with the brake spider and interleaved disks connected with said sleeve, a spool-shaped pressure plate between said packs and axially slidable externally of the sleeve, a bearing encircling the pressure plate, a ring mounted on said bearing, a yoke lever pivoted to the ring, and for which said housing provides a fulcrum, a rod pivoted to the end of the lever opposite said fulcrum and projecting from said housing, a portion of the housing proximate said rod constituting a coolant sump, a cylinder mounted externally at each side of the housing and enclosing respective ends of the rod, valve-controlled means leading to each cylinder from said sump, pistons mounted at the ends of the rod within the respective cylinders, fluid pressure lines leading to the respective cylinders for imposing pressure on the respective pistons for the actuation of said rod, and pressure-controlled duct means leading from the respective cylinders to the vicinity of the respective packs for delivering coolant thereto from said sump as said coolant is displaced in respective cylinders by the piston therein.

10. A clutch and brake according to claim 9 in which bearings for the driven shaft are spaced and a coolant chamber between said bearings is a part of said duct means and is closed at its ends by seals, said duct means extending into said chamber and thence through said shaft to the locality of respective disk packs and thence radially of said shaft toward said disk packs.

* * * * *